US009183328B2

(12) United States Patent
Liang et al.

(10) Patent No.: US 9,183,328 B2
(45) Date of Patent: Nov. 10, 2015

(54) METHOD AND APPARATUS FOR MODELING INTERACTIONS OF THE FLUID WITH SYSTEM BOUNDARIES IN FLUID DYNAMIC SYSTEMS

(71) Applicant: Engine Simulation Partners LLC, San Diego, CA (US)

(72) Inventors: Long Liang, San Diego, CA (US); Anthony Shelburn, San Diego, CA (US); Cheng Wang, San Diego, CA (US)

(73) Assignee: Engine Simulation Partners, LLC, San Diego, CA (US)

( * ) Notice: Subject to any disclaimer, the term of this patent is extended or adjusted under 35 U.S.C. 154(b) by 366 days.

(21) Appl. No.: 13/662,266

(22) Filed: Oct. 26, 2012

(65) Prior Publication Data

US 2013/0297267 A1    Nov. 7, 2013

Related U.S. Application Data

(60) Provisional application No. 61/551,590, filed on Oct. 26, 2011.

(51) Int. Cl.
*G06F 17/50* (2006.01)

(52) U.S. Cl.
CPC ........ *G06F 17/5018* (2013.01); *G06F 17/5009* (2013.01); *G06F 17/5095* (2013.01); *G06F 2217/16* (2013.01)

(58) Field of Classification Search
None
See application file for complete search history.

(56) References Cited

U.S. PATENT DOCUMENTS

| | | | |
|---|---|---|---|
| 7,024,342 B1 | 4/2006 | Waite | |
| 2002/0032494 A1 | 3/2002 | Kennon | |
| 2007/0162267 A1 | 7/2007 | Richards | |
| 2011/0112800 A1 | 5/2011 | Kim | |

OTHER PUBLICATIONS

T. Ye, et al., "An Accurate Cartesian Grid Method for Viscous Incompressible Flows with Complex Immersed Boundaries," Journal of Computational Physics, vol. 156, 1999, pp. 209-240.*
Y. Tseng, et al., "A Ghost—Cell Immersed Boundary Method for Flow in Complex Geometry," Journal of Computational Physics, vol. 192, 2003, pp. 593-623.*
R. Neel, "Advances in Computational Fluid Dynamics: Turbulent Separated Flows and Transonic Potential Flows," PhD Thesis, Virginia Polytechnic Institute and State University, Aug. 1997, 272 pages.*

(Continued)

*Primary Examiner* — Aniss Chad
*Assistant Examiner* — David M Rogers
(74) *Attorney, Agent, or Firm* — Jones Day

(57) ABSTRACT

A method and apparatus for accessing a data representation of a model associated with a fluid system, the data representation including at least one interior cell and at least one ghost cell, calculating a physical volume value and physical surface area value for at least one interior cell and at least one ghost cell, generating at least one control volume based on one or more physical volume values, generating at least one control surface based on one or more physical surface area values; substituting one or more of the at least one control volume parameter and the at least one surface area for corresponding elements of mathematical conservation equations representative of the fluid system, and solving the mathematical conservation equations representative of the fluid system.

24 Claims, 7 Drawing Sheets

(56) References Cited

OTHER PUBLICATIONS

H. Bandringa, "Immersed Boundary Methods," Masters Thesis, University of Groningen, The Netherlands, Aug. 2010, 130 pages.*

M. Tyagi, et al., "Large Eddy Simulation of Turbulent Flows in Complex and Moving Rigid Geometries Using the Immersed Boundary Method," International Journal for Numerical Methods in Fluids, vol. 48, 2005, pp. 691-722.*

H. Udaykumar, "Multiphase Dynamics in Arbitraty Geometries on Fixed Cartesian Grids," Journal of Computational Physics, vol. 137, pp. 366-405, 1997.*

H. Udaykumar, "Computation of Solid-Liquid Phase Fronts in the Sharp Interface Limit on Fixed Grids," Journal of Computational Physics, vol. 153, pp. 535-574, 1999.*

J. Lee, "Development of an Efficient Viscous Approach in a Cartesian Grid Framework and Application to Roto-Fuselage Interaction," PhD Thesis, Georgia Institute of Technology, Aug. 2006, 163 pages.*

J. Lee, et al., "Development of a Turbulent Wall-Function Based Viscous Cartesian-Grid Methodology," AIAA Aerospace Sciences Meeting and Exhibit, Jan. 8-11, 2007, 10 pages.*

J. Lee, et al., "Application of a Turbulent Viscous Cartesian-Grid Methodology to Flowfields with Rotor-Fuselage Interation," AIAA Aerospace Sciences Meeting and Exhibit, Jan. 8-11, 2007, 13 pages.*

International Search Report and Written Opinion in International Application No. PCT/US2012/62174, dated Jan. 7, 2013.

Tseng et al., "A ghost-cell immersed boundary method for flow in complex geometry." Journal of Computational Physics (online), Dec. 10, 2003.

Liang et al. "Validation of an Automatic Mesh Generation Technique in Engine Simulations." International Multidimensional Engine Modeling User's Group Meeting, Detroit, Michigan, Apr. 23, 2012.

* cited by examiner

METHOD AND APPARATUS FOR MODELING INTERACTIONS OF THE FLUID WITH SYSTEM BOUNDARIES IN FLUID DYNAMIC SYSTEMS

RELATED APPLICATIONS

The present application claims priority under 35 U.S.C. §119(e) to U.S. Provisional Application No. 61/551,590, titled "METHOD AND APPARATUS FOR MODELING INTERACTIONS OF THE FLUID WITH THE SYSTEM BOUNDARIES IN FLUID DYNAMIC SYSTEMS" and filed on Oct. 26, 2011, which is hereby incorporated by reference in its entirety and for all purposes.

TECHNICAL FIELD

The present application relates generally to the simulation of fluid dynamic systems, and more particularly, to modeling interactions of the fluid with the system boundaries in such systems.

BACKGROUND

Analysis of fluid dynamic systems involves the study of complex interrelationships between fluids and systems and volumes through which they flow. Over time, analysis methods for fluid dynamic systems have evolved from methods of observing fluid flow in actual physical models such as those employing cameras, streamers, and specialized lighting, for example, to powerful computational fluid dynamic (CFD) modeling techniques. CFD provides for the rapid and accurate solution of complicated numerical equations and numerous mathematical representations of the respective physical relationships in order to determine properties of static and transient fluid dynamic systems. Since CFD is based on the solution of equations and mathematical expressions that represent fluid dynamic systems (such as conservation equations, for example), CFD can reduce or even eliminate the need to build and test physical prototypes of fluid dynamic systems. Existing modern CFD models and techniques make it possible to quickly simulate and analyze fluid systems over varying system parameters such as boundary conditions, fluid properties, initial conditions, and fuel-injection strategies, among others, without constructing or using actual physical models to run simulations. This rapid simulation and analysis facilitates accurate and cost-effective modeling, design, development and analysis of fluid dynamic systems.

SUMMARY

Various aspects of examples of the invention are set out in the claims.

According to a first aspect of the present invention a method is provided for accessing a data representation of a model associated with a fluid system, the data representation including at least one interior cell and at least one ghost cell, calculating a physical volume value and physical surface area value for at least one interior cell and at least one ghost cell, generating at least one control volume based on one or more physical volume values, generating at least one control surface area based on one or more physical surface area values; substituting one or more of the at least one control volume parameter and the at least one control surface area for corresponding elements of mathematical conservation equations representative of the fluid system, and solving the mathematical conservation equations representative of the fluid system.

According to a second aspect of the invention, an apparatus is provided, the apparatus comprising means for accessing a data representation of a model associated with a fluid system wherein such data representation includes a system boundary, at least one interior cell with several cell faces, and at least one ghost cell with several cell faces; means for calculating a physical volume value and a physical surface area value for at least one interior cell and at least one ghost cell; means for generating at least one control volume based on one or more physical volume values; means for generating at least one control surface based on one or more physical surface area values; means for substituting one or more of the at least one control volume parameter and the at least one control surface area for corresponding elements of mathematical conservation equations representative of the fluid system; and means for solving the mathematical conservation equations representative of the fluid system.

According to a third aspect of the invention, an apparatus is provided, the apparatus comprising at least one processor and at least one memory including computer program code, the at least one memory and the computer program code configured to, with the at least one processor, cause the apparatus to perform at least the following: accessing a data representation of a model associated with a fluid system wherein such data representation includes a system boundary, at least one interior cell with several cell faces and at least one ghost cell with several cell faces; calculating a physical volume value and a physical surface area value for at least one interior cell and at least one ghost cell; generating at least one control volume based on one or more physical volume values; generating at least one control surface based on one or more physical surface area values; substituting one or more of the at least one control volume and the at least one surface area for corresponding elements of mathematical conservation equations representative of the fluid system; and solving the mathematical conservation equations representative of the fluid system.

Another aspect of the invention pertains to apparatus and computer program products, including machine-readable media on which program instructions and/or arrangements of data for implementing the methods described above may be provided. For the performance of certain method operations, program instructions may be provided as computer code. Data, if employed to implement features of this invention, may be provided as data structures, database tables, data objects, or other appropriate arrangements of specified information. Any of the methods of this invention may be represented, in whole or in part, as program instructions and/or data provided on machine-readable media.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Figure 1:
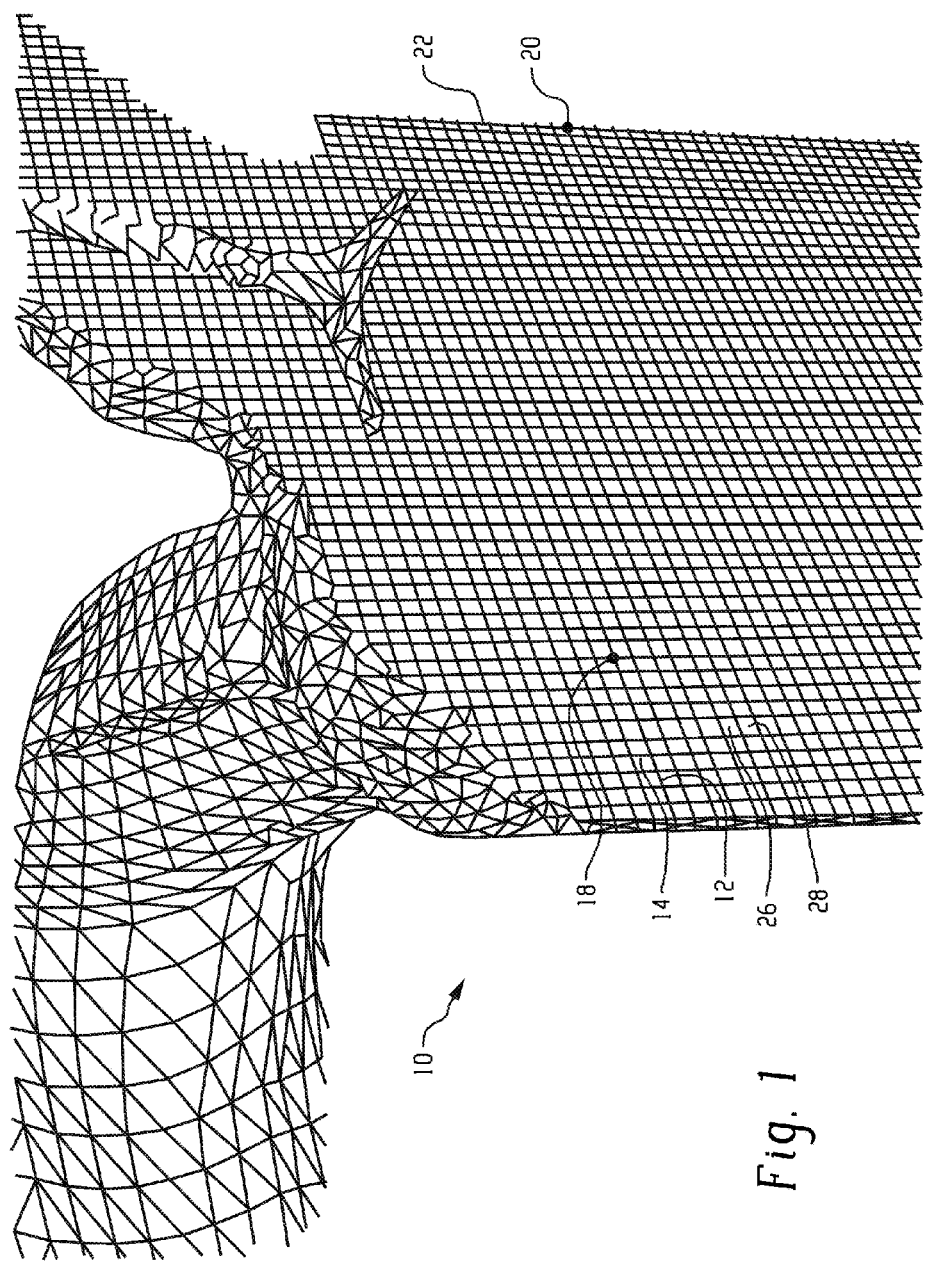
FIG. 1 is a perspective view of a mesh representation of a combustion chamber and valve interface of an internal combustion engine.

Example embodiments of the present invention and their potential advantages are understood by referring to FIGS. 1-7 of the drawings.

CFD may be applied to analyze all manner of fluid dynamic systems, ranging from various aspects of combustion engines such as piston, jet and gas-turbine engines, for example, to the flow of ocean water over and around topographic features on the ocean floor. CFD may also be employed to analyze and solve relationships in fluid systems, such as in the modeling of velocity and thermal parameters, among others. For example, CFD may be applied to analyze and determine "law-of-the-wall" (LOTW) relationships with analogies between heat, mass and momentum transfer mechanisms. Particularly where complicated fluid systems are being studied, or a broad range of system parameters is being analyzed, numerical computers may provide rapid and accurate analysis of the myriad complicated equations that must be solved in this endeavor. Employing CFD techniques in conjunction with the use of powerful computing devices may provide understanding and accurate modeling of complicated systems, without the construction or utilization of expensive hardware prototypes and time-consuming empirical measurements. Obvious benefits include the rapid development and efficient design, optimization of operating conditions, and analysis of complex systems without resorting to actual physical testing of the systems.

Many CFD analysis methods typically begin with geometrically approximating the fluid system under study. A generic CAD 2-dimensional or 3-dimensional model of the system is often suitable for this purpose. The fluid domain of the system (area, in 2D systems; or volume, in 3D systems) may then be divided into a number of cells, creating a computational "mesh." Various meshing methodologies and techniques are known in the art, and efficiencies can be realized when CAD models of the fluid geometry are compatible with corresponding mesh representations of the fluid system. As an example, a mesh may be based on a regular Cartesian grid representation of the area or volume of a particular fluid system, such as a tubular manifold through which a fluid flows. In order to determine the fluid properties of the system represented by the mesh, the governing CFD equations may be solved for particular system cells in question, by discretizing the differential equations that mathematically describe conservation of momentum, energy, mass, chemical species, and other thermophysical properties of the system over the computational mesh, and integrating with respect to the cell areas or volumes. There are numerous discretization methods, including the finite element finite volume, and finite difference methods. Solution of the CFD equation variables requires specification of the fluid domain boundary conditions around the area or volume being modeled as well as the temporal initial conditions and flow phenomena. These initial and boundary conditions constrain the mathematical models to allow the system of differential equations to be converted into algebraic equations associated with discrete elements throughout the fluid domain.

Although various types of grid and coordinate systems exist for modeling, Cartesian grids, particularly grids with orthogonal axes in 2 or 3-dimensions, provide for straightforward finite volume and finite difference analysis. Finite volume and finite difference techniques tend to be more accurate when applied to perfectly orthogonal Cartesian systems, since exact relationships between neighboring cell centers and interfaces may be determined analytically. Solving conservation equations between adjacent cells in such regular, repeating systems allows the straightforward determination of unknown values and properties within adjoining cells of uniform volume and that share a common cell face. More specifically, in a mesh system of regular repeating cells, by solving conservation equations between adjoining cells, known properties, forces and values in one cell may be used to determine unknown properties, forces and values in an adjacent cell. By propagating this solution methodology between adjacent pairs of cells throughout orthogonal dimensions of a fluid area or volume defined as a Cartesian grid, fluid thermodynamic and flow properties may be determined for all cells within such a system, for both static and transient flows.

Such solution processes can be applied to fluid dynamic systems. Further, decreasing the cell size in a uniformly repeating and regular Cartesian system increases the accuracy of the system. Decreasing cell size to improve accuracy requires more calculation and solution time, because of the increased number of complex equations and calculations. Such increases may be partially countered by the use of powerful computing devices, which enhance the speed and accuracy of solving large numbers of complex mathematical equations. Thus, employing mathematical modeling techniques, particularly in combination with powerful computers, allows more rapid and accurate design, development and analysis of fluid dynamic systems. This reduces the need for physical prototypes for the study, design and development of fluid systems, and facilitates more rapid development cycles.

Although modeling techniques and the use of computing devices have provided significant benefits, intractable problems arise in modeling boundaries of fluid dynamic systems, particularly where the system boundaries do not align with the grid. For example, a regular, repeating Cartesian grid may be perfectly fitted to a fluid channel of square or rectangular cross-section. A mesh that is perfectly "body-fitted" to system boundaries, such as an orthogonal mesh perfectly fitted to a square or rectangular fluid system, facilitates straightforward calculation of conservation equations between identical cells, including those cells at the system boundaries. Because all cells in such a system are of uniform size, it is a straightforward exercise to input system conditions and properties for the cells at which these conditions are known, and to solve conservation equations between adjoining cells to determine the unknown fluid properties and conditions at the adjoining cells. Such a process, initiated with given conditions provided at certain cells, and constrained by boundary conditions, may be repeated for all cells of the entire system to determine the conditions and properties throughout the entire system.

Although a Cartesian mesh greatly simplifies the solution of conservation equations between adjacent cells, due to the regular, repeating nature of a Cartesian grid, many fluid systems cannot be exactly represented by a uniformly repeating Cartesian mesh. For example, when analyzing a pipe or other system shape that includes curved walls, inlets, outlets, or moving parts, the system boundaries may not perfectly coincide with the edges and faces of cells in a Cartesian mesh. The occurrence of gaps or interference mismatches between the system boundary and the Cartesian mesh results. It is easy to visualize other common fluid systems that give rise to such problems, such as where a fluid passage is cylindricallyshaped or includes an interior feature such as a butterfly valve or a bolt passage, for example. That is, a Cartesian mesh consisting of square- or cube-shaped cells will not perfectly "fit" a cylindrical, or irregularly-shaped fluid passage—at the boundary, cells will either interfere with the boundary and be subject to truncation, or will not abut the surface of the boundary. This is undesirable because scenarios involving gaps or interference with system boundaries can produce inaccurate results, or instability and system errors. Reduced mesh cell sizes may improve coincidence between the complete mesh cells or cubes and system boundaries, thus improving accuracy. However, increasing the number of cells in a fluid system with highly-irregular boundaries to an acceptable degree of accuracy may involve so many cells as to make the analysis time-prohibitive, even with powerful computing devices.

As a result, other approaches have arisen. One approach is to create "body-fitted" meshes where the cells are distorted relative to the ideal cubic shape of a Cartesian mesh cell, in order to conform to the boundary surface. Another class of approaches involves "immersing" or "embedding" the boundary within the mesh. This may involve the use of irregularly-shaped cells at the boundary, the shapes of which are defined by the system boundaries (the so-called "cut cells" approach); the use of regularly shaped cells that extend outside of the physical boundary, or so-called "ghost cells." Variations of such methods are of some utility in improving the accuracy and efficiency of fluid system analysis. In particular, since certain "ghost cell" methods facilitate the utilization of a regular repeating grid throughout the system of interest, consideration of irregularly-shaped cells is not required, and computational advantages and efficiencies may be realized. Despite the obvious benefits over actual physical prototyping and testing, however, "body-fitted" and "immersed boundary" meshing methods, even those involving "ghost cell" methods, may contribute high levels of assumption, inaccuracy or solution time to CFD analysis.

Compounding the problems that arise due to imperfect fitting of Cartesian meshes to irregular shaped systems, is the consideration of fluid boundary layer effects, which introduces additional complications and sources of inaccuracy. That is, inherent effects of fluid viscosity and boundary layer flow at system boundaries add greater mathematical complexity to CFD analysis, particularly in the consideration of irregularly-shaped fluid domains. Existing techniques such as those discussed above are useful in modeling such systems, although they may require assumptions that produce results with unacceptable levels of inaccuracy and error convergence. As previously noted, accuracy may be improved by employing meshes with increased numbers of cells, particularly at system boundaries and irregularities, but the required computing and calculation times may be unacceptable. It is thus useful to leverage the computational advantages of using "immersed" Cartesian meshes for CFD analysis (particularly "ghost cell" methods), especially for irregularly-shaped fluid systems, in a way that does not require an inordinately large number of cells and computations to achieve the desired accuracy.

In an embodiment of the present invention, a method for modeling and analyzing fluid dynamic systems includes accessing a mathematical or numerical representation of the geometry of a fluid system. The shape and boundaries of the system may be defined by computer-aided-design (CAD) drawings that detail the curvature, surfaces, clearances, and interfaces between material boundaries. CAD systems may be used to generate depictions and mathematical representations of various items in "wireframe form," although modern CAD systems may also be used to generate and manipulate surfaces. Such depictions are very useful in the analysis and design of various items and complex systems, such as automobile and aircraft engines and other components, for example. CAD drawings and data may be generated in various types of coordinate systems, such as orthogonal, radial, rectilinear, curvilinear, etc., and numerous software packages and systems exist to facilitate generating CAD data. CAD drawings and data generated in the orthogonal coordinate axes of a Cartesian grid system, in particular, provide a particularly advantageous depictions of items due to the regular repeating nature of the squares or cubes that result. A regular repeating grid arrangement facilitates straightforward location and analysis of particular points or elements of the depiction on the grid, as well as straightforward mathematical manipulation of the relevant coordinates (i.e., calculations using Cartesian coordinates are generally less complicated and less cumbersome than calculations involving degrees and radial coordinates, for example).

In addition to CAD design and modeling, various other methods may be used for designing and depicting fluid systems. For example, scaled hand drawings or physical prototypes may provide for accurate and precise depiction of fluid systems and the mathematical or numerical coordinates of particular items or areas of interest in such systems. Data from such drawings, models, CAD data, or any other type of depiction which provides for precise determination of system boundaries and accurate location of particular system features may be utilized in conjunction with methods that embody aspects of the present invention, in order to analyze fluid systems. In fact, almost any system that depicts a fluid system in a way that mathematically or numerically defines the relative locations of boundaries and other points in the fluid system may be utilized in conjunction with embodiments of the invention. In certain embodiments of the invention, the models, depictions, and definitions of fluid systems may be generated as an integrated part of the fluid system analysis. In other embodiments, pre-existing models, depictions and definitions that were created independently may be utilized. In either case, such a pre-existing model, or one that is generated as an integrated part of the fluid analysis process, may be accessed or referenced for analysis in according to respective embodiments of the invention. For example, such data may be uploaded, downloaded or otherwise retrieved from a network or computer storage media by a computing device.

In an embodiment, to divide the fluid domain into discrete, finite locations for solving governing fluid dynamics equations, a numerical grid representation of the fluid continuum (in 2-dimensions or 3-dimensions) may be accessed. In similar fashion to the geometric representation of the system boundaries, as discussed above, the computational mesh may be generated as an integrated part of the fluid system analysis. In other embodiments, pre-existing meshes that were created independently may be utilized. In other embodiments, the geometric representation may be accessed or generated together with the computational mesh. As discussed above, such data may be uploaded, downloaded or otherwise retrieved from a network or computer storage media by a computing device. Utilizing CAD data and computer-generated mesh models leverage the efficiency of electronic computing devices for fluid system analysis because a CAD model of a system provides a digitized representation of the system geometry as well as representation of the system boundary surfaces, which may be readily accessed, retrieved or generated by such devices, as may a computer-generated mesh fluid domain model.

This computational mesh may include "nodes," or discrete locations on the mesh. In such a representative meshed geometry, nodes are discrete representative points at which values may be calculated and generated based on boundary conditions and mathematical relationships and conservation equations (such as those concerning energy, momentum and heat transfer, as well as chemical species, and other thermophysical properties of the system). FIG. 1 illustrates a computational mesh representation of a valve and cylinder interface of an internal combustion engine 10. The mesh 10 may include coordinate axes 12 and 14, extending in 2 of 3 coordinate dimensions, such as "X" and "Y." Mesh 10 may also include coordinate axes extending in a third "Z" direction. In computational mesh 10, the coordinate axes 12 and 14 are arranged in a Cartesian relationship, and are thus orthogonal to each other (i.e., there is a 90-degree angle between the X and Y coordinate axes). In a Cartesian 3-dimensional mesh coordinate system the Z axis is also orthogonal to the X and Y axes, such that the X, Y and Z axes are mutually orthogonal to each other.

Referring again to FIG. 1, there is illustrated a 3-dimensional computational mesh 10 that depicts a fluid system in the form of a valve-piston interface in an internal-combustion engine. Of course, any type of fluid system that is capable of being represented as a mesh or modeled in a coordinate system may be analyzed in accordance with embodiments of the invention. As discussed above, mesh 10 may include mutually-orthogonal coordinate axes 12 and 14, that provide an advantageous way to mathematically define the coordinates of points, elements and features of the system. For example, point 18, an interior point of the cylinder, may be depicted and referenced by its coordinates on mesh 10 (x', y') (although "Z" axes are not depicted in FIG. 1, it is to be appreciated that point 18 may be further described by coordinate z' on the "Z" axis). As another example, a point 20 on cylinder wall 22 (which happens to constitute a system boundary in FIG. 1), may be depicted and referenced by its coordinates (x", y", z"). As discussed above, mutually-orthogonal mesh systems, such as Cartesian coordinate mesh systems, may be particularly advantageous for the depiction and analysis of fluid systems, due to their regular, repeating structure. As will be discussed in greater detail below, defining a fluid system on a mathematical or numerical basis provides for the solution of relevant conservation equations to determine system properties at particular points or in particular regions of the system. Mathematical or numerical definition of systems also facilitates the analysis of systems using electronic computing devices, since they are capable of performing numerically based computation with speed and accuracy, thus resulting in highly efficient analysis of complex systems.

In addition to individual points of interest in a fluid system, other features and regions of a system may be mathematically depicted by coordinate points on a grid. For example, fluid system boundaries are often of particular interest in fluid system analysis, and numerical representations of particular regions of a fluid boundary facilitate mathematical solutions regarding fluid properties in these regions. Defining a coordinate system, such as a Cartesian coordinate system, for example, to depict a fluid dynamic system results in an embedded mesh 10 that subdivides the computational domain, as illustrated in FIG. 1. As discussed above, discrete points in mesh 10 may function as "nodes," or points within the system that may be referenced, or located, using their coordinates. In addition, the axes of a Cartesian mesh 10 define cells 26. Depending on the nature of the system analysis being undertaken, nodes may be defined at points where mesh axes intersect, such as nodes 18 or 20; or nodes may be located within the interior of cells, such as node 28. Nodes and cells facilitate the extrapolation and interpolation of values from points or "nodes" where properties of interest are known, to nodes at which the respective properties of interest are not known. By employing methods in accordance with embodiments of the present invention as detailed below, such extrapolation or interpolation may be propagated throughout a fluid system to provide an accurate and comprehensive analysis of system properties, and the ability to identify properties at virtually any point throughout the system. Moreover, these methods may be used in the context of steady-state systems and transient systems, i.e., those in which conditions such as flow rate and temperature, for example, are changing over a time period of interest.

The evaluation and analysis of fluid systems utilizing computational meshes may be facilitated by the application of finite difference and finite volume methods to determine system properties throughout the system. The system properties correspond to solutions of the governing equations of fluid dynamics at discrete points, or nodes, in the system. Solutions may be found by discretizing the differential equations that describe conservation of momentum, energy, mass, chemical species and other components on a computational mesh 10, and integrating with respect to the volume of a respective cell 26. A detailed description of theory underlying finite volume and finite difference methods is beyond the scope of this disclosure and is not necessary to understand embodiments of the invention. That said, regarding finite volume methods, partial differential equations may be solved at small "finite volumes," or cells 26 that surround a respective node 28. The solutions involve evaluation of fluxes of heat, energy, etc. across the surfaces and through the volumes of each cell 26. According to conservation principles, fluxes entering a given finite volume are identical to fluxes leaving an adjacent volume, or cell 30. Applying this principle facilitates solution of the relevant equations at various discrete points throughout a system to generate system values for parameters such as fluid velocity, temperature, etc., at these points.

I. Immersed Boundary Methods for Fluid System Modeling

Figure 2:
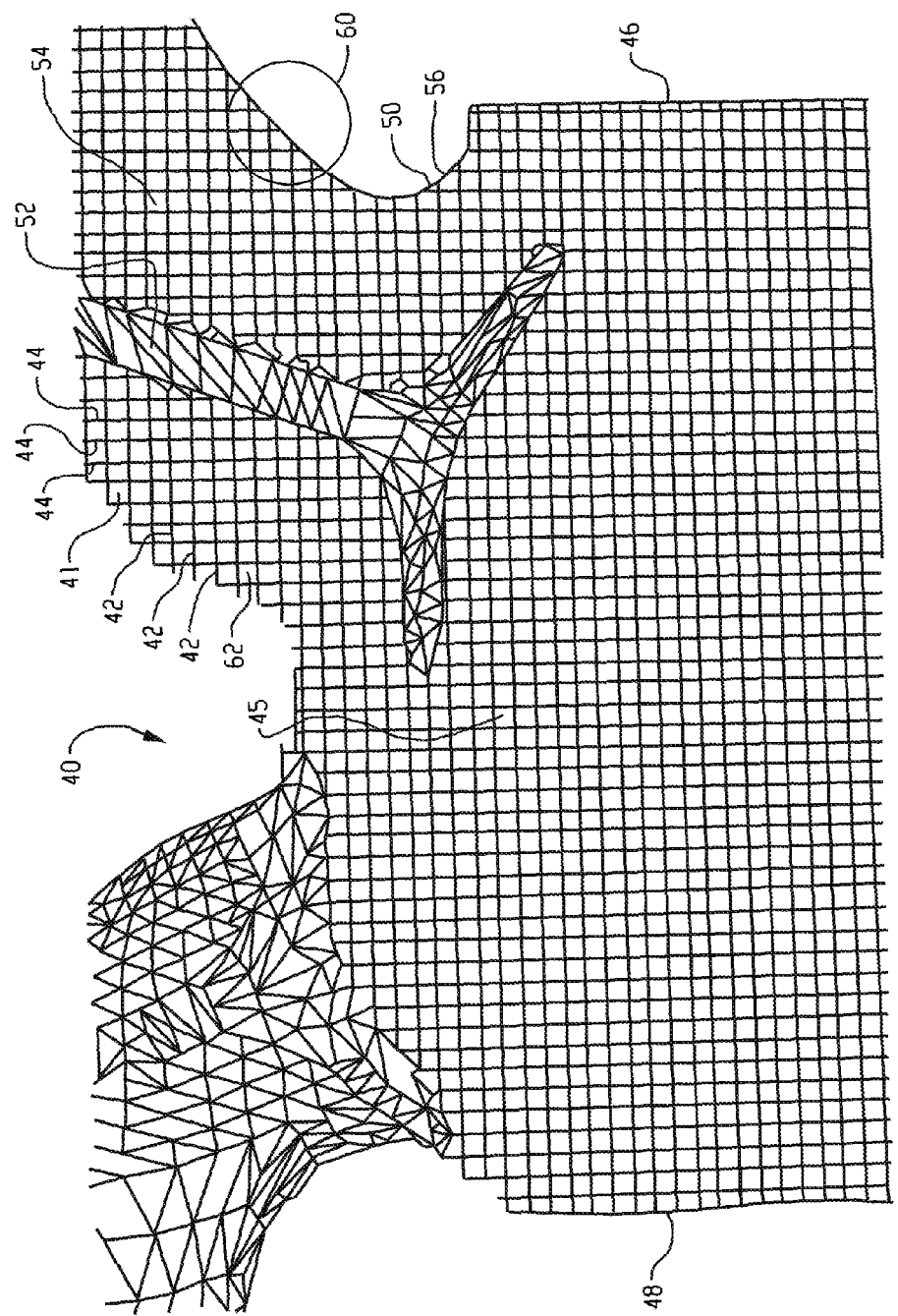
FIG. 2 is a sectional view of the mesh representation illustrated in FIG. 1.
Figure 3:
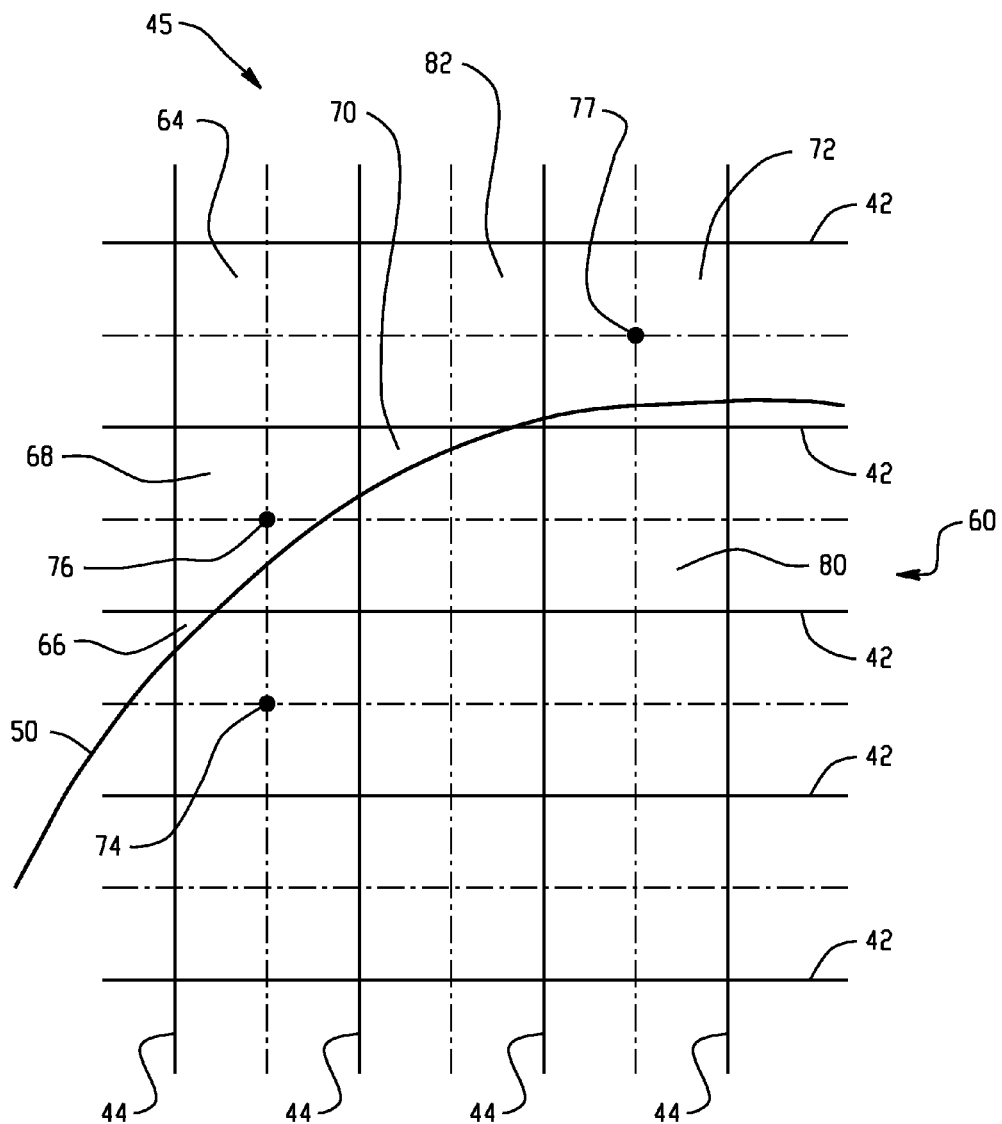
FIG. 3 is a schematic 2-dimensional representation of a region depicted in FIG. 2 illustrating a fluid system boundary and ghost cells.

Immersed boundary methods (IBM) are useful in modeling and simulating fluid dynamic systems. Features and characteristics of IBM afford these methods to compatibility with straightforward Cartesian computational meshes, without having to resort to cell distortion or high cell densities at the system boundaries. As discussed above, since the axes of Cartesian grids are, by definition, oriented at 90° to each other (whether in 2-dimensions as illustrated in FIG. 2, or 3-dimensions, as illustrated in FIG. 1), applying IBM to the analysis of fluid dynamic systems defined as Cartesian meshes may reduce the complexity of solving the representative governing equations. In contrast, geometric systems such as those in the "body-fitted" or "boundary-conforming" methods, both of which may distort regular cell shapes to fit irregular system boundaries, require the solution of the representative governing equations over inherently more complex geometries. This may require longer solution times and result in the potential for greater inaccuracies. Although the effect of inaccuracies may generally be reduced by specifying smaller cell sizes, increasing the mesh density by reducing the cell size to achieve an acceptable level of accuracy may result in unacceptably long solution and analysis times, especially in the context of transient system analysis. Nevertheless, due to efficiencies in embodiments of the invention, it is to be understood that embodiments of the invention are not limited to employing Cartesian meshes or grid systems, or any particular cell shape. In fact, embodiments of the invention may employ other types of geometries, meshes and cell shapes to model and evaluate fluid dynamic systems.

As discussed above, analysis of fluid systems with boundaries perfectly aligned with the axes of a coordinate system is straightforward. Physical principles and discretization methods for conservation equations may be utilized to determine system properties throughout the system of interest, based on initially-specified system and boundary conditions. However, systems with irregularly-shaped boundaries may give rise to inaccuracies because the cells of a regular repeating coordinate system do not usually align perfectly with irregular system boundaries. Gaps and interferences between coordinate system axes and system boundaries may occur as a result. These gaps and interferences may produce errors and inaccuracy, because solving representative fluid differential equations between adjacent cells with accuracy may be simplified by a regular alignment of adjacent cell boundaries. Irregular cell shapes and mismatched boundaries between adjacent cells introduce asymmetry and instability into conservation equations, potentially leading to inaccurate data and results. Methods to address such issues are know in the art, such as utilizing approximations and assumptions, and the reduction of coordinate system cell size at areas where cells do not neatly conform to system boundaries. However, such methods may not result in acceptable levels of accuracy within reasonable compute times, especially at or near system boundaries, where boundary layer flows may introduce additional complexity.

II. Ghost-Cell Functions for Boundary Region Analysis.

As discussed above, employing a Cartesian computational mesh in the analysis of fluid systems may provide for reduced complexity. In an embodiment of the invention, computational analysis may be addressed and resolved by applying a ghost-cell analysis method in combination with "law of the wall" physical principles, as discussed below. In an embodiment of the invention, a "ghost cell" approach may be utilized in combination with an immersed boundary method for mesh definition, to address these issues and improve accuracy. For explanatory purposes, this approach will first be described in connection with a 2-dimensional mesh representation. Referring now to FIG. 2, there is illustrated a 2-dimensional sectional representation of a valve and cylinder interface 40 of an internal combustion engine. Mesh 40 includes a grid 41 with x axes 42 and y axes 44, and depicts the interior 45 of a fluid system partially bounded by cylinder walls 46, 48 and manifold wall 50. X axes and y axes intersect to define regularly repeating cells, generally depicted by representative cell 62. As discussed elsewhere, conservation equations may be solved at the interface of neighboring cells 62 to determine fluid properties at unknown cells, based on known properties of neighboring cells. For explanatory purposes, intake valve 52 is shown in an open position, providing a fluid flow path from intake manifold 54, along and past valve seat 56, into cylinder interior 45. As particularly seen in detail area 60, due to the curvature of manifold wall 50, cells 62 formed by the x axes 42 and y axes 44 are truncated in detail area 60 because the curvature does not align with the square shape of the cells of the grid 41.

Before a more detailed discussion of the methods for calculating system parameters in accordance with embodiments of the invention, a brief description of the ghost cell concept and "law of the wall" treatment is appropriate. Both the ghost cell concept and "law of the wall" treatment are familiar to those skilled in the art; a full description of each is beyond the scope of this disclosure and not necessary to understand the invention. However, it is informative to provide a brief discussion regarding these concepts.

Generally, ghost-cell methods utilize extrapolation and interpolation to define variables on a background Cartesian mesh, and to solve representative fluid dynamic transport equations based on the regular Cartesian cells in areas immediately proximate to irregularly-shaped system boundaries. Referring now to FIG. 3, which illustrates the detail of area 60 (shown in FIG. 2) in larger scale, there is seen manifold wall 50. Grid 41 is also shown in FIG. 3, as defined by the x axes 42 and y axes 44, which also define a system of regular repeating cells generally similar to representative cell 64. Manifold wall 50 represents a linear boundary of a fluid system depicted using the immersed boundary method, as discussed above. Manifold wall 50 does not coincide with axes 42 and 44 of grid 41, and thus "cuts," or divides cells 66, 68, 70, 72 through which it passes. According to certain ghost-cell methods, cells 66, 68, 70, 72 cut by manifold 50 are identified either as ghost cells, or as disposed in the physical domain, based on whether the respective cell center is inside or outside the fluid system as defined by its boundary. See "*A ghost-cell immersed boundary method for flow in complex geometry*," Tseng, Ferziger, Journal of Computational Physics 192 (2003) 593-623.

Referring again to FIG. 3, the center, or "node" 74 of cell 66 lies just outside manifold wall 50. In contrast, node 76 lies just inside of manifold wall 50, within the physical fluid flow region of interest. In general, a cell with a cell center located on the opposite side of the system boundary from the fluid system being studied is designated as a ghost cell, with a respective ghost node, and belonging to the "ghost cell domain." Id. On the other hand, any cell with a center located in the flow region under study, i.e., "inside" of the boundary is considered within the "flow" domain. Id. Thus, cells 66 and 70 are ghost cells, inside the ghost cell domain; and cells 68 and 72 are considered as within the flow domain. According to certain ghost-cell methods, extrapolation and interpolation methods are applied to analyze cells cut by boundaries in order to guarantee that the exact boundary conditions are enforced on the physical boundary. As will be discussed in greater detail, below, embodiments of the invention employ novel treatments of ghost cells in the analysis of fluid systems.

Figure 4:
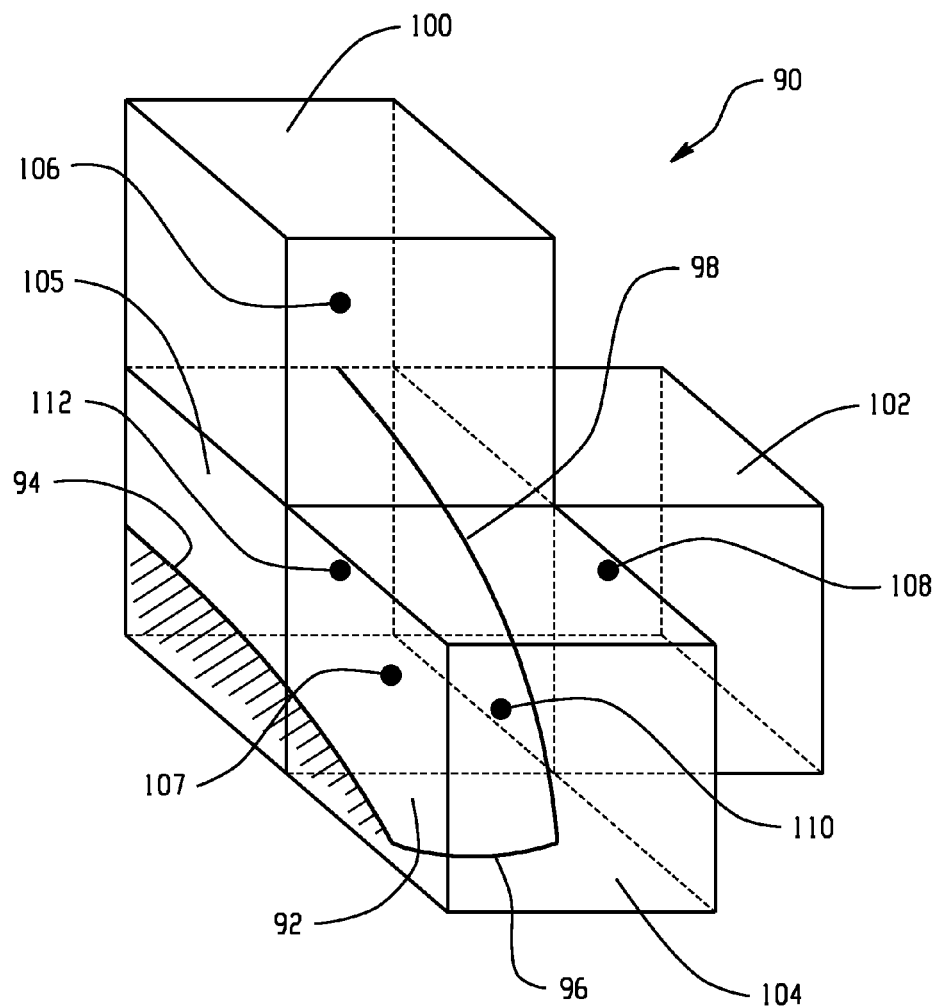
FIG. 4 is a schematic 3-dimensional representation of a fluid system boundary and ghost cells for use in analysis of fluid system boundaries.

Analogously, as shown in FIG. 4, ghost-cell methods may be applied in 3-dimensions, to allow for the use of Cartesian coordinate systems in the analysis of fluid system with boundaries that do not coincide with system axes. In the schematic view shown in FIG. 4, a boundary region of a fluid system is depicted by a 3-dimensional computational mesh 90. The fluid region boundary surface 92 is bounded by segments 94, 96 and 98. Mesh 90 includes cells such as cell 105 in the "ghost domain." Since the center 112 of cell 105 is outside the "fluid" region, cell 105 thus resides in the "ghost domain." Point 107 is on boundary surface 92, and may be used in mathematical calculations related to extrapolations and interpolation schemes to determine values related to ghost cell 105, which may in turn be used in boundary layer functions to determine fluid properties throughout the system.

III. Law of the Wall Functions

"Law of the wall" methods and functions are employed to analyze fluid system characteristics near system boundaries. Law of the wall treatments provide for mathematical determination and modeling of fluid velocity profiles and thermodynamic properties in the area of fluid-boundary interfaces (i.e., "boundary layer effects"). As will be discussed in greater detail below in connection with embodiments of the invention, immersed boundary mesh definition methods along with ghost-cell treatments may be utilized to determine key input parameters such as control volume, in order to apply "law of the wall" functions to determine properties and characteristics of fluid systems.

In an embodiment of the invention, a method is provided to utilize the ghost-cell method with law-of-the-wall treatment to model boundary layer effects in fluid systems, without resolving boundary layers with the computational mesh. The method may include accessing a 2-dimensional or 3-dimensional computational mesh model of a fluid system. Such 2-dimensional and 3-dimensional models are illustrated in FIG. 1 and FIG. 2, respectively. As discussed above, the use of Cartesian coordinate systems provides for straightforward calculation of relevant fluid system equations. However, the descriptions of and references to Cartesian coordinates herein are provided as examples of embodiments, and are not intended to limit the invention. Fluid system models based on other types of coordinate systems may be utilized in other embodiments of the invention to analyze fluid systems of interest. These may include models based on or generated in rectilinear, curvilinear, radial or any other type of coordinate system. Although other coordinate systems may require the solution of more complex and cumbersome equations than required by the use of Cartesian systems, manipulation and translation of coordinates within and between coordinate systems may be used. The use of coordinate systems other than Cartesian systems is thus entirely consistent and not incompatible with embodiments of the invention and is contemplated within the scope of the present invention.

Further, the use of virtually any type of fluid system model is compatible with embodiments of the invention. As an example, many methods and techniques for generating models may be used in conjunction with embodiments of the invention. Or, pre-existing models of fluid systems generated may be accessed for such analysis. In embodiments of the invention, once a computational mesh is generated, it may be accessed for further analysis in embodiments of the invention. In other embodiments, a computational mesh may be generated as part of the overall CFD analysis process. In one embodiment, an IBM model generation method may be used to define a coordinate mesh that represents a fluid system of interest within defined system boundaries.

Figure 5:
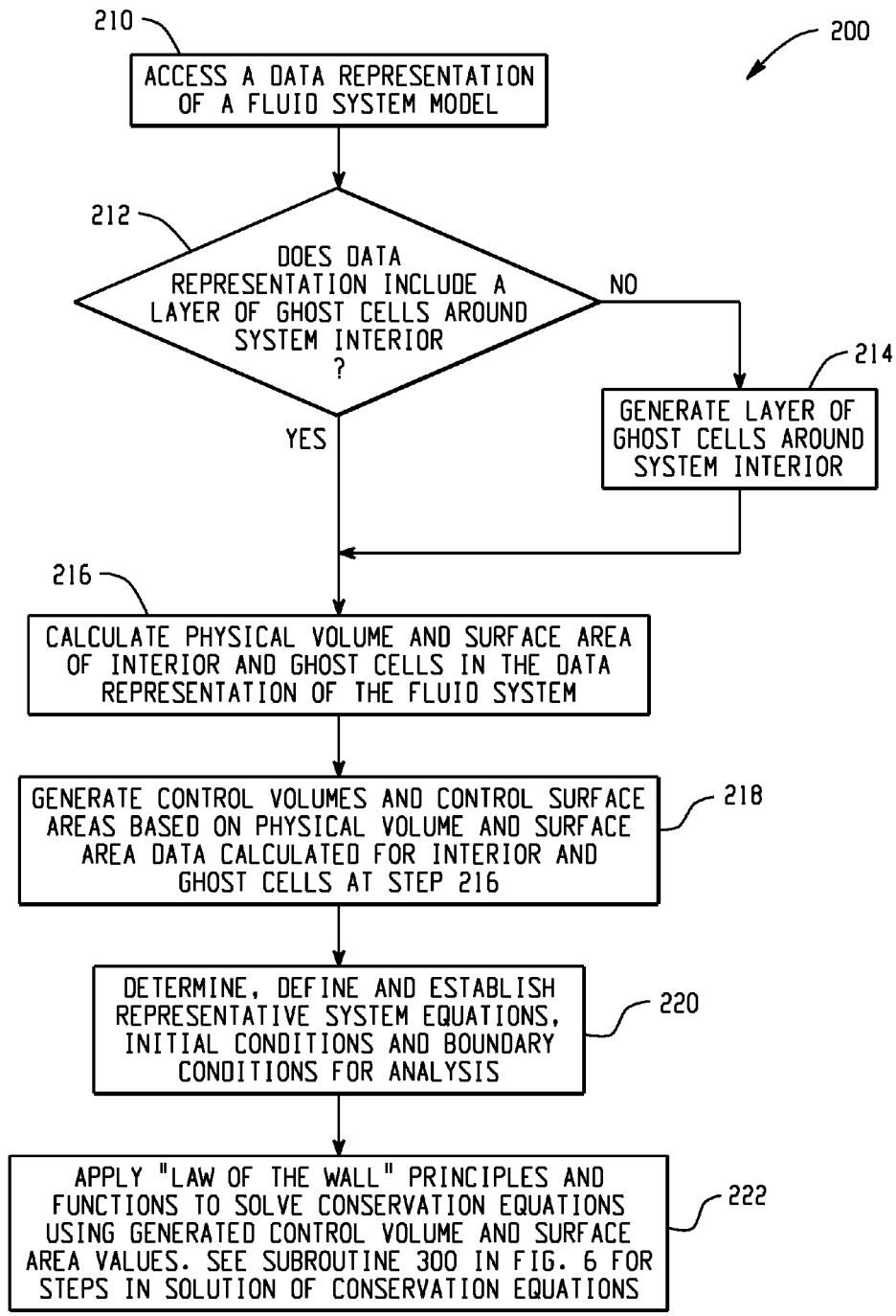
FIG. 5 is a flowchart illustrating a method according to an embodiment of the present invention.

Referring now to FIG. 5, there is shown a method 200 in accordance with an embodiment of the invention. At block 210, data representing a model of a fluid system is accessed from a storage device, such as a database or other memory, for example. As discussed above, the accessed data may include a CAD depiction of the boundaries of the fluid system. The data may also include a computational mesh representation of "interior" or "active region" that is bounded by the system boundaries. The "interior" or "active region" of a fluid system refers to the region of fluid flow through the system of interest, i.e., the fluid continuum. Such a mesh representation of an "active region" 45 is illustrated in FIGS. 2 and 3. As another example, data representing a pipe may include an "active region" that is the interior of the pipe. In an embodiment of the invention, the data representation of the model may be based on a Cartesian coordinate system, with a regular, repeating grid system and cells defined by mutual orthogonal axes that extend beyond the boundaries of the "active region" (e.g., that extend past the walls of the pipe) to define cells that extend outside the boundaries of the "active region." As previously discussed, FIG. 2 illustrates a mesh 40 that includes a grid 41 with x axes 42 and y axes 44, which represent the interior 45 or "active region" of a fluid system partially bounded by cylinder walls 46, 48 and manifold wall 50, which is itself a system boundary.

The next step in exemplary method 200 is determining whether the data representation of the fluid system includes a layer of ghost cells that envelops the system interior (block 212). For clarity, FIG. 2 does not depict axes 42 and 44 extending beyond the system boundaries, and thus, "ghost cells" are not depicted in their entirety in FIG. 2; only portions of ghost cells within the system interior 45, or "active region" are illustrated as part of the mesh depicted in FIG. 2. Thus, a determination is made about whether a set of ghost cells must be defined to envelop the interior of the system of interest (block 212). In embodiments of the invention, if a data representation of a fluid system that is accessed does not include a layer of ghost cells, generation of a layer of ghost cells (block 214) may be undertaken. On the other hand, if the data representation includes such a layer of ghost cells at the time the data representation is accessed, the method may proceed directly to block 216.

Referring again to FIGS. 2 and 3, region 60 of FIG. 2, as shown in greater detail in FIG. 3, illustrates that several cells 66, 68, 70, 72 are "cut" by manifold wall 50 (a "system boundary"). In an embodiment of the invention, the interior 45, i.e., the "active region," or portion of the system within the system boundaries, is wrapped by a layer of ghost cells 66, 70, 80. If the data representation of the fluid system of interest does not already include a layer of ghost cells, such a layer may be generated. A ghost cell is a cell which: i) has a center that is "outside" the system boundaries; and ii) is either "cut" by a system boundary and abuts (i.e., shares a face or a wall with) an interior cell; or is not "cut" by a system boundary although it abuts an interior cell that is itself "cut" by the system boundary. For example, ghost cell 66 has a center 74 that is outside manifold wall 50, and ghost cell 66 is "cut" by manifold wall 50 and also abuts interior cell 68. Although interior cell 68 is itself "cut" by manifold wall 50, the center 76 of cell 68 is "inside" manifold wall 50 (i.e., the system boundary), and cell 68 is thus an "interior" cell. As another illustrative example, ghost cell 70 has a center 73 that is "outside" manifold wall 50. And, ghost cell 70 abuts interior cell 82. As illustrated in FIG. 3, interior cells include both cells such as cell 64 that are not cut by manifold wall 50, and also cells 68, 72 that are cut by manifold wall 50, in a way that the cell centers 76, 77 are within in the interior 45 of the fluid system (i.e., "inside" the system boundary, or within the "active region"). In yet another example, cell 80 includes a cell center 83 that is "outside" manifold wall 50 but is not itself "cut" by manifold wall 50. Nevertheless, cell 80 is a ghost cell even though it is not so "cut," because it abuts interior cell 72, which is "cut" by manifold wall 50. Although interior cell 72 is cut by boundary wall 50, its center 77 is within the "active region." Thus, in accordance with an embodiment, a layer of ghost cells envelops all of the cells within the system boundaries and a ghost cell abuts each interior cell in the immediate vicinity of the system boundary.

The immediately preceding examples, as illustrated by FIGS. 2 and 3, provide an understanding of ghost cells in the context of 2-dimensional models. FIG. 4 illustrates a 3-dimensional data representation of a fluid system model for analysis in accordance with an embodiment. In FIG. 4 is illustrated a portion 90 of a 3-dimensional mesh representing a fluid system bounded by surfaces, for numerical analysis in accordance with this embodiment. The relationships between interior cells and ghost cells in a 3-dimensional model are analogous to those in a 2-dimensional model, and do not require detailed explanation. Briefly, boundary surface 92 is a system boundary, and is itself defined by boundary segments 94, 96, 98. Cells 100, 102, and 104 are within the interior of the fluid system, as are their respective cell centers 106, 108, 110, or "nodes." In contrast, cell 105 is a ghost cell, because it is "cut" by surface 92 (a "system boundary"), its center 112 is "outside" the system boundary, and cell 105 abuts interior cells 100, 102, 104, which themselves may or may not be "cut" by surface 92. Thus, in an embodiment, a layer of ghost cells envelops all of the cells within the system boundaries, and a ghost cell abuts each interior cell in the immediate vicinity of the system boundary, in analogous fashion to the 2-dimensional representation illustrated in FIG. 3.

As discussed above, several methods for defining and generating a layer of ghost cells to envelop an "active region" of a fluid system may be used. A more detailed description of such methods is beyond the scope of this disclosure and is not necessary for understanding the invention. Nevertheless, referring again to FIG. 5, the determination at block 212 may include confirming whether the data representing the fluid dynamic system of interest includes a layer of ghost cells enveloping the "interior" or "active region" of the system. If the data does not include such a layer, it may be generated (block 214). If, on the other hand, the data accessed includes such a layer, the method proceeds directly to block 216. In an embodiment, each "interior" cell at the system boundary shares a cell face with at least one ghost cell. Such "interior" cells are referred to herein as "interior boundary cells."

Referring again to FIG. 5, the physical volume and physical surface area contained in cells of the mesh representation of the fluid system of interest are calculated (block 216). Such calculations may include both the interior cells and the ghost cells. Methods for calculating physical volumes and physical surface areas of 2-dimensional and 3-dimensional cells, as appropriate, in coordinate systems may be used for modeling the fluid system. For accurate modeling and results, however, the respective sums of the volumes and surface areas of the interior cells of the system represented by the model will recover the total volume and surface area of the physical system. In an embodiment of the invention utilizing Cartesian mesh model of a fluid system, such surface area and volume recovery may be facilitated by refining the Cartesian interior boundary cells and ghost cells to generate "pseudo-cells," with a shape defined by the intersection of the boundary with the cell shape, and re-calculating the surface area and volume values. In embodiments of the invention, algorithms such as the "Marching Cubes" or "Marching Tetrahedra" algorithms, for example, may be applied to each refined pseudo-cell for calculating the volume and surface area of the portion of the cell within the boundary. In embodiments of the invention, the "pseudo-cells" may be utilized for these surface area and volume calculations, while the background Cartesian mesh, and the respective system interior cells defined by the background Cartesian mesh may be used to solve the governing conservation and fluid dynamic equations for the system. In such embodiments, the surface area and volume calculations may be performed (block 216), and the resulting values and data may be used to determine particular terms in the governing equations, such as control volumes and control surfaces, for example. Thus, while "cut-cell" immersed boundary approaches utilize reshaped cells and mathematical treatments for performing calculations with reshaped cells, the "pseudo-cells" generated according to embodiments of the invention provide for the generation of control volumes used to recover the physical interior volume and system boundary area, but are not used for boundary condition calculations (as described in greater detail, below). Such embodiments may facilitate discretization and numerical operations over regularly-shaped cells with accuracy. The numerical treatment of irregularly-shaped cells may thus be avoided, even for complex and irregular system geometries.

As previously discussed, it is to be appreciated that embodiments of the invention are not limited to analysis utilizing Cartesian grid systems, but may utilize other coordinate systems, including the analysis of fluid dynamic systems utilizing other coordinate systems, as well as translation of data between coordinate systems. Although Cartesian systems in particular are discussed in connection with exemplary embodiments of the invention herein, the use of other coordinate systems that facilitate calculation and analysis of the relevant fluid dynamic equations by means of ghost cell methods is in keeping with embodiments of the invention. Moreover, other methods for calculating accurate cell volumes may be employed in embodiments of the invention.

As mentioned above, control volumes and control surface areas may provide the basis for establishing the discretized equations for the transport of heat, mass, momentum or other conserved property across boundaries in a fluid system. In an embodiment of the invention, control volumes and control surface areas may be generated utilizing the calculated physical volumes and surface areas of the interior boundary cells and ghost cells (block 218).

In an embodiment, the calculation of control volumes may be performed at the system boundaries, as seen in FIG. 3. For example, at boundary 50, this calculation may begin with an interior Cartesian cell 68 that has at least one face in common with at least one ghost cell. The control volume based on cell 68 equals its own physical volume, calculated at block 216 of FIG. 5, plus some contribution from each of its neighboring ghost cells 66 and 70. According to an embodiment, a ghost cell may contribute some fraction of its physical volume to all of its neighboring interior cells. For example, and not for purposes of limitation, ghost cell 70 contributes some percentage of its physical volume, calculated at block 216 of FIG. 5, to interior cells 68 and 82, as determined by the amount of volume of the ghost cell that is within the interior of the system boundaries and the number of interior cells that are neighbors to the ghost cell. Similar calculations are performed to determine the physical surface area values of the cells. These calculations may be repeated for all interior and ghost cells in the system boundary region, to determine physical volume and surface area parameters for use in solving the conservation equations. It is to be appreciated that contribution percentage of each ghost cell's volume and surface area is variable and related to characteristics of the fluid system of interest and its boundaries, such as, for example, the portion of the ghost cell outside the system boundary, or the number of neighboring interior cells. For example, in an embodiment, the calculated physical volume of each ghost cell may be distributed evenly among all neighboring interior cells.

Upon calculation of control volumes and surface areas at block 218, the relevant equations for the analysis may be determined, and initial and boundary conditions for analysis may be defined or established (block 220). For example, to begin computational analysis of a fluid system, initial conditions such as boundary temperature, fluid properties and velocity, fluid temperature, chemical composition, etc., may be input to begin solution of the respective conservation equations based on known conditions, or particular conditions of interest. Moreover, the selection of particular equations to be solved for particular system properties of interest may occur at this step. As an additional note, it is to be appreciated that the use, in CFD, of the governing equations of fluid dynamics will be understood by those skilled in the art. These equations may include, among others, various differential, mathematical and algebraic forms of the conservation equations of heat, momentum and energy, as well as related equations such as those regarding fluid velocity, and other system properties.

Moreover, these equations may include forms specifically-tailored to determine and account for particular system parameters and properties of interest. While a detailed description regarding the selection of particular equations or equation forms for use in CFD analysis is not required to understand the invention, it is to be noted that embodiments of the invention may utilize various types and forms of the governing equations of fluid dynamics.

Following the definition or establishment of initial and boundary conditions "law of the wall" principles and functions may be applied to solve conservation equations among neighboring cells to determine fluid system parameters at the boundary, and consequently, throughout the system of interest (block 222). Solution of conservation equations for various fluid system properties, such as heat and energy, for example, depends on the input or substitution of values for certain variables in these equations. For example, and as described in greater detail, below, tangential relative velocity between a fluid and a wall (i.e., a system boundary, or manifold wall 50, as illustrated in FIG. 3), is a key input parameter for wall functions. In addition, fluid velocity is based on the average of the interior vertices of a heat transfer control volume. Thus, calculation of control volumes and surface areas as discussed above (block 218) facilitates determination of values that consequently are used in the solution of conservation equations. Facilitating and propagating solutions of the heat, energy and momentum conservation equations from system boundaries (employing law-of-the wall principles), and from cell-to-cell, in turn provides for the determination of properties throughout the fluid system, which may be expressed by, or included in other governing equations regarding physical characteristics and properties of the system of interest.

Figure 6:
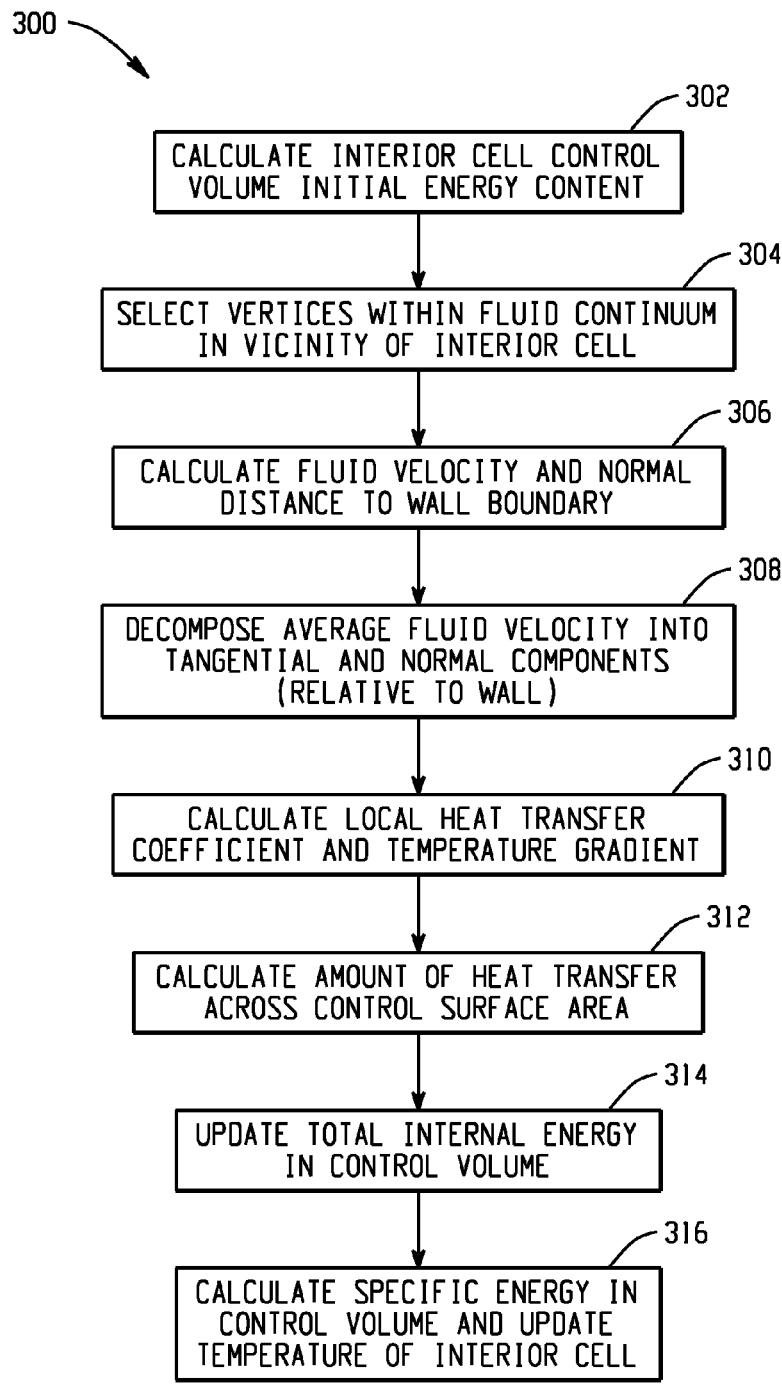
FIG. 6 is a flowchart illustrating a method according to an embodiment of the present invention.

According to an embodiment, energy transfer from the boundary and updating of cell temperature and internal energy due to heat transfer may occur through a cell-to-cell propagation sub-process. An example of this sub-process is illustrated in FIG. 6. In accordance with the embodiment of the sub-process 300 illustrated in FIG. 3, after control volume and surface area values are determined for an interior boundary cell, the initial energy content in a particular control volume may be calculated as the specific internal energy multiplied by the volume of the control volume (block 302). In an embodiment, the specific internal energy may be defined at the center of the interior boundary cell. Several vertices within the fluid continuum and in the vicinity of the interior boundary cell may be selected (block 304).

The vertices may be selected in accordance with various methods. For example, in an embodiment, the vertices that are on the interior boundary cell and within the physical wall boundary may be selected (a vertex is "inside" the physical system boundary if its normal distance to the boundary is positive). As another example in another embodiment, vertices may be selected that are on the interior boundary cell and that do not adjoin a ghost cell. The fluid velocity and the normal distance to the wall boundary may be calculated based on the average of these selected vertices (block 306). The averaged velocity may be decomposed into tangential and normal components relative to the wall (block 308). The local heat transfer coefficient may be calculated based on the tangential velocity, and the temperature gradient may be calculated (block 310) based on the temperature in the interior boundary cell and the wall boundary temperature.

A 2-step calculation may be utilized in an embodiment to determine the amount of heat transfer across the control surface area (block 312). Heat flux may be calculated as the product of the heat transfer coefficient and the temperature gradient values discussed above. Multiplying the heat flux calculated in this way, by the control surface area of the cell in question, yields the amount of heat transfer across the control surface area. The amount of heat transfer calculated may be applied to update the total internal energy in the control volume (block 314). Specific internal energy in the control volume (defined at the interior cell center) may be calculated as the updated total internal energy divided by the volume of the control volume (block 316). The temperature of the interior cell may be updated based on the updated specific internal energy. Sub-process 300 may be applied and propagated from the system boundary through all interior boundary cells in the fluid system, based on the governing equations and conservation principles.

Thus, the solutions for conservation equations determined through the use of embodiments of the invention may become the basis for determining properties throughout the fluid system of interest. Facilitated by the use of coordinate systems, such as a Cartesian coordinate system, for example, the conservation equation analysis and the results determined for the interior boundary cells may be propagated from one cell to the next in a fluid system, to determine system properties and characteristics throughout the entire system. Cell centers may function as "nodes" and shared cell faces may provide for the flux of properties between adjoining cells, that facilitate repeated solution of conservation equations, and propagation of these solutions for the other governing equations throughout the system.

The method and systems described above may be used to generate an improved model of the fluid system based on the solutions for the conservation equations.

IV. Computing Apparatus and Systems

It is understood that the various embodiments of the present invention may be implemented individually, or collectively, in devices comprised of various hardware and/or software modules and components. Such a device, for example, may comprise a processor, a memory unit, and an interface that are communicatively connected to each other, and may range from desktop, server and/or laptop computers, to consumer electronic devices such as mobile devices and the like. Such devices may include input and peripheral devices, and other components that enable the device to read and receive data and instructions from various media, input devices, a network, or other inputting means in accordance with the various embodiments of the invention. It should be understood, however, that the scope of the present invention is not intended to be limited to one particular type of device.

Figure 7:
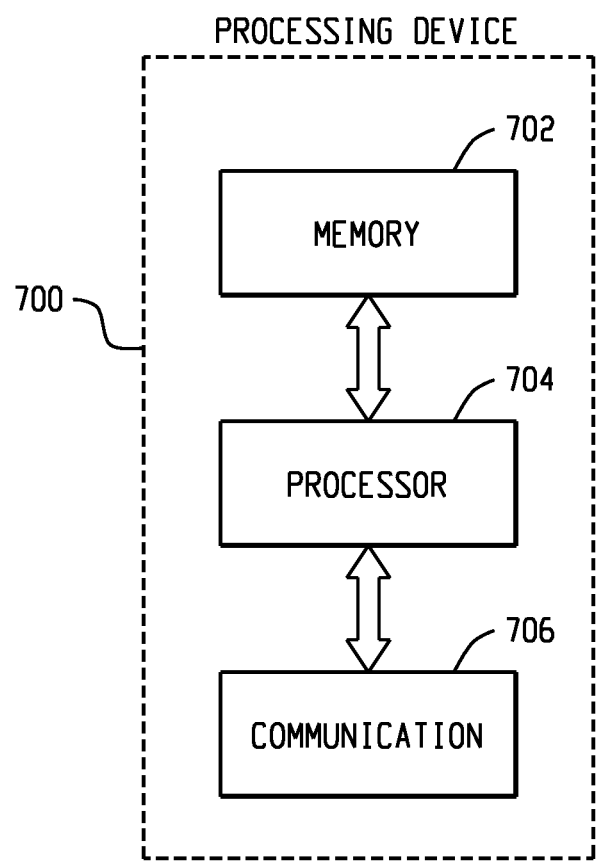
FIG. 7 illustrates an exemplary device within which the various embodiments may be implemented.

As an example, FIG. 7 illustrates a block diagram of a device 700 within which the various embodiments of the present invention may be implemented. The device 700 comprises at least one processor 704 and/or controller, at least one memory unit 702 that is in communication with the processor, and at least one communication unit 706 that enables the exchange of data and information, directly or indirectly, with a communication medium, such as the Internet, or other networks, entities and devices. The processor 704 can execute program code that is, for example, stored in the memory 702. The communication unit 706 may provide wired and/or wireless communication capabilities in accordance with one or more communication protocols and interfaces, and therefore it may comprise the proper transmitter/receiver antennas, circuitry and ports, as well as the encoding/decoding capabilities that may be necessary for proper transmission and/or reception of data and other information.

Similarly, the various components or sub-components within each module of the present invention may be implemented in software, hardware, and/or firmware. The connectivity between the modules and/or components within the modules may be provided using any one of a number of connectivity methods and media, including, but not limited to, communications over the Internet, wired, or wireless networks using the appropriate protocols.

Various embodiments described herein are described in the general context of method steps or processes, which may be implemented in one embodiment by a computer program product or module, embodied in a computer-readable memory, including computer-executable instructions, such as program code, and executed by apparatus such as computers or computing systems in networked environments. A computer-readable memory may include removable and non-removable storage devices including, but not limited to, Read Only Memory (ROM), Random Access Memory (RAM), compact discs (CDs), digital versatile discs (DVD), etc. As such, the various disclosed embodiments can be implemented by computer code embodied on non-transitory computer readable media. In other embodiments processes may be employed to perform operations on data, wherein the instructions for process operations and the data, or elements thereof, may reside on or be transferred through one or more computing devices or systems.

Generally, program products or modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes. Various embodiments may comprise a computer-readable medium including computer executable instructions that, when executed by a processor, cause an apparatus to perform the methods and processes described herein. Apparatus or systems utilized in connection with the invention may be of a general-purpose character, or may be specially constructed, designed or programmed for the required purposes. In embodiments of the invention, such apparatuses and systems may be configured or activated by computer programs, instructions and/or data stored in or transferred into the apparatus or system.

Embodiments of the present invention may be implemented in software, hardware, application logic or a combination of software, hardware and application logic. The software, application logic and/or hardware may reside on a client device, a server or a network component. If desired, part of the software, application logic and/or hardware may reside on a client device, part of the software, application logic and/or hardware may reside on a server, and part of the software, application logic and/or hardware may reside on a network component. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of such a device described and depicted in FIG. 3. A computer-readable medium may comprise a computer-readable storage medium that may be any media or means that can contain or store the instructions for use by or in connection with an instruction execution system, apparatus, or device, such as a computer. In one embodiment, the computer-readable storage medium is a non-transitory storage medium.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from the practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A computer-implemented method, comprising:
accessing a database having a data representation of a fluid system, the fluid system having a system boundary, at least one interior cell with a plurality of interior cell faces and at least one ghost cell with a plurality of ghost cell faces;
determining a physical volume value and a physical surface area value for a plurality of interior cells and at least one ghost cell;
generating a control volume for each of the interior cells based on one or more physical volume values;
identifying a set of interior cells that contact a particular ghost cell;
dividing the physical volume of the particular ghost cell among the interior cells of the set;
generating a control surface area for each of the interior cells based on one or more physical surface area values;
dividing the physical surface area of the particular ghost cell among the interior cells of the set;
substituting one or more of the control volumes and the control surface areas for corresponding elements of mathematical conservation equations representative of the fluid system; and
generating a model of the fluid system based on solutions to the mathematical conservation equations.

2. The method of claim 1, wherein the determining a physical volume value comprises refining a shape of at least one interior cell or at least one ghost cell that is cut by the system boundary and re-calculating the physical volume value, and
wherein the determining a physical surface area value comprises refining a shape of at least one interior cell or at least one ghost cell that is cut by the system boundary and re-calculating the physical surface area value.

3. The method of claim 1, wherein the operation of solving the mathematical conservation equations includes applying "law-of-the-wall" fluid principles and functions.

4. The method of claim 1, wherein the set of interior cells that contact the particular ghost cell contact one or more of a surface, an edge, or a vertex of the ghost cell.

5. The method of claim 1, wherein the physical volume of the particular ghost cell is divided evenly among the interior cells of the set.

6. The method of claim 1, wherein the physical surface area of the particular ghost cell is divided evenly among the interior cells of the set.

7. An apparatus, comprising
means for accessing a database having a data representation of a fluid system, the fluid system having a system boundary, at least one interior cell with a plurality of interior cell faces and at least one ghost cell with a plurality of ghost cell faces;
means for determining a physical volume value and a physical surface area value for a plurality of interior cells and at least one ghost cell;
means for generating a control volume for each of the interior cells based on one or more physical volume values;
means for identifying a set of interior cells that contact a particular ghost cell;
means for dividing the physical volume of the particular ghost cell among the interior cells of the set;
means for generating a control surface area for each of the interior cells based on one or more physical surface area values;
means for dividing the physical surface area of the particular ghost cell among the interior cells of the set;
means for substituting one or more of the control volumes and the control surface areas for corresponding elements of mathematical conservation equations representative of the fluid system; and
means for generating a model of the fluid system based on solutions to the mathematical conservation equations.

8. The apparatus of claim 7, wherein the means for solving the mathematical conservation equations includes means for applying "law-of-the-wall" fluid principles and functions.

9. The apparatus of claim 7, wherein the means for calculating a physical volume value comprises means for refining a shape of at least one interior cell or at least one ghost cell that is cut by the system boundary and re-calculating the physical volume value, and wherein the means for calculating a physical surface area value includes means for refining a shape of at least one interior cell or at least one ghost cell that is cut by the system boundary and re-calculating the physical surface area value.

10. The apparatus of claim 7, wherein the set of interior cells that contact the particular ghost cell contact one or more of a surface, an edge, or a vertex of the ghost cell.

11. The apparatus of claim 7, wherein the physical volume of the particular ghost cell is divided evenly among the interior cells of the set.

12. The apparatus of claim 7, wherein the physical surface area of the particular ghost cell is divided evenly among the interior cells of the set.

13. An apparatus, comprising: at least one processor; and at least one memory including computer program code, the at least one memory and the computer program code configured to, with the at least one processor, cause the apparatus to perform at least the following:
accessing a database having a data representation of a fluid system, the fluid system having a system boundary, at least one interior cell with a plurality of interior cell faces and at least one ghost cell with a plurality of ghost cell faces;
determining a physical volume value and a physical surface area value for a plurality of interior cells and at least one ghost cell;
generating a control volume for each of the interior cells based on one or more physical volume values;
identifying a set of interior cells that contact a particular ghost cell;
dividing the physical volume of the particular ghost cell among the interior cells of the set;
generating a control surface area for each of the interior cells based on one or more physical surface area values;
dividing the physical surface area of the particular ghost cell among the interior cells of the set;
substituting one or more of the control volumes and the control surface areas for corresponding elements of mathematical conservation equations representative of the fluid system; and
generating a model of the fluid system based on solutions to the mathematical conservation equations.

14. The apparatus of claim 13, wherein the determining a physical volume value comprises refining a shape of at least one interior cell or at least one ghost cell that is cut by the system boundary and re-calculating the physical volume value, and
wherein the determining a physical surface area value comprises refining a shape of at least one interior cell or at least one ghost cell that is cut by the system boundary and re-calculating the physical surface area value.

15. The apparatus of claim 13, wherein the operation of solving the mathematical conservation equations includes applying "law-of-the-wall" fluid principles and functions.

16. The apparatus of claim 13, wherein the set of interior cells that contact the particular ghost cell contact one or more of a surface, an edge, or a vertex of the ghost cell.

17. The apparatus of claim 13, wherein the physical volume of the particular ghost cell is divided evenly among the interior cells of the set.

18. The apparatus of claim 13, wherein the physical surface area of the particular ghost cell is divided evenly among the interior cells of the set.

19. A non-transitory computer-readable medium encoded with instructions for commanding one or more data processors to execute a method that comprises:
accessing a database having a data representation of a fluid system, the fluid system having a system boundary, at least one interior cell with a plurality of interior cell faces and at least one ghost cell with a plurality of ghost cell faces;
determining a physical volume value and a physical surface area value for a plurality of interior cells and at least one ghost cell;
generating a control volume for each of the interior cells based on one or more physical volume values;
identifying a set of interior cells that contact a particular ghost cell;
dividing the physical volume of the particular ghost cell among the interior cells of the set;
generating a control surface area for each of the interior cells based on one or more physical surface area values;
dividing the physical surface area of the particular ghost cell among the interior cells of the set;
substituting one or more of the control volumes and the control surface areas for corresponding elements of mathematical conservation equations representative of the fluid system; and
generating a model of the fluid system based on solutions to the mathematical conservation equations.

20. The non-transitory computer-readable medium of claim 19, wherein the determining a physical volume value comprises refining a shape of at least one interior cell or at least one ghost cell that is cut by the system boundary and re-calculating the physical volume value, and wherein the determining a physical surface area value comprises refining a shape of at least one interior cell or at least one ghost cell that is cut by the system boundary and re-calculating the physical surface area value.

21. The non-transitory computer-readable medium of claim 19, wherein the operation of solving the mathematical conservation equations includes applying "law-of-the-wall" fluid principles and functions.

22. The computer-readable medium of claim 19, wherein the set of interior cells that contact the particular ghost cell contact one or more of a surface, an edge, or a vertex of the ghost cell.

23. The computer-readable medium of claim 19, wherein the physical volume of the particular ghost cell is divided evenly among the interior cells of the set.

24. The computer-readable medium of claim 19, wherein the physical surface area of the particular ghost cell is divided evenly among the interior cells of the set.

* * * * *